United States Patent
Salazar et al.

(10) Patent No.: US 8,123,124 B2
(45) Date of Patent: Feb. 28, 2012

(54) MAGNETIC STRIPE CARD ANTI-FRAUD SECURITY SYSTEM

(76) Inventors: Efrain Salazar, Mexico City (MX); Rodolfo Ramirez, Mexico City (MX); Armando Rangel, Mexico Ciity (MX)

( * ) Notice: Subject to any disclaimer, the term of this patent is extended or adjusted under 35 U.S.C. 154(b) by 1293 days.

(21) Appl. No.: 11/686,307

(22) Filed: Mar. 14, 2007

(65) Prior Publication Data

US 2008/0223921 A1 Sep. 18, 2008

(51) Int. Cl.
*G06K 5/00* (2006.01)

(52) U.S. Cl. ...................................................... 235/380

(58) Field of Classification Search .................. 235/380, 235/492, 493, 379
See application file for complete search history.

(56) References Cited

U.S. PATENT DOCUMENTS

| | | | |
|---|---|---|---|
| 7,249,092 B2 * | 7/2007 | Dunn et al. ...................... 705/38 |
| 7,249,112 B2 * | 7/2007 | Berardi et al. .................. 705/79 |
| 7,757,952 B2 * | 7/2010 | Tuschel et al. ................. 235/440 |
| 2004/0145986 A1 * | 7/2004 | Taylor ........................... 369/53.1 |

* cited by examiner

*Primary Examiner* — Seung Lee
(74) *Attorney, Agent, or Firm* — Rick B. Yeager

(57) ABSTRACT

To prevent fraud, a magnetic card's ID, which may be a stripe ID or security chip, is converted to an encrypted card ID, which is stored on the card and in a database. Information about the card's history is captured, encrypted, and stored on the card and in a database. To validate the card, the magnetic card ID on the card is again converted to the card ID. This card ID is then compared with the card ID for that card in the database. The card history data stored on the card may also be compared, for validity and to determine points of fraud, with the card history data stored in the database. The data in the card's magnetic card ID can also be compared with the decrypted data in the card ID stored on that card to help determine the card's validity, for example, when the database is inaccessible. Card data about the account holder, stored on the card's magnetic stripe, may also be used to create the card ID for verification.

8 Claims, 12 Drawing Sheets

| S.L. | O | CONFIGURATION | CHARACTERISTICS | COMMENTS |
|---|---|---|---|---|
| 0 |   | Card Anti-Fraud Security Production Subsystem – Personalization Output Module | Ability to define responsibilities between Bank and Card Producer |   |
| 1 | + | Card Anti-Fraud Security Bank/Customer Subsystem – Black Box, Production Update Module, Investigations Module and Investigation Workstation | Ability to define valid cards |   |
| 2 | + | Card Transaction Validation Module and Teller/POS Card Reader Modules | Ability to define valid cards at the point of sale |   |
| 5 | + | Delivered Cards Module | Ability to transfer responsibility to the account holder; Ability to detect card differences from production information |   |
| 6 | + | Storage Control Module | Ability to control reception and delivery of blank card stock; Track Production security base stock balance; Track Destruction Acts |   |
| 7 | + | Finishing Module | Ability to control the card finishing process and match it with the card production module and the production information file |   |
| 8 | + | Production Module | Ability to control the differences in each step of the production process; Ability to define personal responsibilities, which adds detail to the Production security base stock balance and the Historic data base | One module in each production equipment unit |
| 9 | + | Personalization Input Module | Prevents premarking operators from feeding blank cards stock different from the lot assigned to him. |   |
| 10 | + | Quality Verification Workstation | Increases the quality level of the production process |   |

FIG 6

Card History Database
312

Card ID
130

Card History Data
140

FIG 9

MAGNETIC STRIPE CARD ANTI-FRAUD SECURITY SYSTEM

FIELD OF THE INVENTION

The present invention relates generally to systems and processes for verifying transactions involving magnetic stripe-bearing documents.

BACKGROUND OF THE INVENTION

Magnetic Stripe-Bearing Documents

Magnetic stripe-bearing documents, for example credit cards, banking cards, and debit cards, are used for a growing number of transactions. In this patent application, the term "card" is used to refer to any magnetic stripe-bearing document, and the phrase "credit card transaction" is used to refer to any transaction involving a magnetic stripe-bearing document. The term "card" is further used to refer to cards with security chips. Also he phrase "financial card" is used to refer generally to credit, banking, and debit cards.

In addition, the following terms are defined for use in this patent application:

Magnetic stripe card—a plastified card with a magnetic stripe on the back. It can be used for banking or identification purposes. The magnetic stripe cannot be removed without physically damaging the card, thus becoming an integral part of the card.

Magnetic stripe—a stripe of magnetic material on which data can be digitally or analogically recorded.

Magnetic Stripe ID—A data set (numeric, alphanumeric explicit or coded) that uniquely identifies each magnetic stripe card during the card's life.

Card data—The information recorded on the magnetic stripe. It typically has the bank ID and the account number.

Card—A fully identified and controlled magnetic stripe card.

Card ID—The resulting data set (numeric, alphanumeric explicit or coded) from an algorithm or a mathematical function of the card data and the magnetic stripe ID. It uniquely identifies each card through its life and is defined, stored on a production database and recorded on the magnetic stripe during the card production process.

Valid Card ID—The unique identification of a produced card.

Invalid Card—Any card that does not have a matching unique identification within the a valid cards database, explained below, or calculated from the information recorded on the magnetic stripe.

Live Card—A card in the possession and responsibility of the account holder, which at risk of alteration, stealing and cloning.

Live Cards Database—The universe of valid cards at risk.

POS terminal—Point-of-sale terminal, a device designed to read cards and process the payments made with them.

The characteristic fingerprint of a banking card is an element that cannot be changed or modified without physically damaging or destroying the card. There are different such elements that can be found in a card such as:

Magnetic stripe—the structure/distribution of the magnetic material molecules of a predefined stripe is unique and characteristic for that stripe, and it can be mapped to a code using a mathematical function over the measurement or detection of one of, or a subset of, the several magnetic field elements of that specific stripe. That is what is called a "Magnetic Stripe ID."

RFID—Radio frequency identification (RFID) has a manufacturer-implanted code that is unique for that specific device and is usually embedded in the card.

Intelligent Chip—The chips used in banking and prepaid cards also have a manufacturer-implanted code that is unique for that specific device and that cannot be changed without destroying the chip. The chip can be cut out the card and placed on another card or fried on a microwave oven, but then the data on the card and/or the magnetic stripe ID (which is the chip back up) will not match.

The Production of Cards

Magnetic stripe cards are produced in specialized shops. The process starts with the blank magnetic stripe cards, i.e. the magnetic stripe cards with the desired background image of a customer such as a bank.

The production of the magnetic stripe cards might require the use of several steps with different equipment. The produced magnetic stripe cards sometimes are stored before continuing with the card-production process, and all the movements in and out of these secure storage areas must be controlled. In the encoding stage of the process, the magnetic stripe card is converted into a produced card by printing and embossing the information of the account holder and recording the card data on the magnetic stripe of the card. Usually at this stage there is a quality-assurance process or station.

The produced cards are delivered by courier service to the account holder, who visually verifies the card, signs the receipt and signs the card. Then the account holder calls the issuing bank to activate the card. Afterwards, the account owner is ready to use the card to make different payments. When the account owner opens a card account, the name and address as well as the valid signatures and pay conditions are registered at the bank. When the card is subsequently presented for payment, the magnetic stripe is read on the POS terminal, which extracts the data, sends it for validation to the bank, and waits for acceptance or rejection of the payment. If the transaction is accepted, the POS terminal prints a voucher and a copy, and the merchant sees that the voucher is signed with the appropriate signature and then delivers the copy and the purchased goods.

Problem—Card Fraud

Card fraud is a growing problem worldwide. The current increased security measures for preventing such fraud increase the costs of credit card transactions and cause verification-related delays at points of sale that adversely affect both the merchants and the customers. One of the many credit card fraud schemes is "skimming," where an unauthorized person, typically a dishonest employee of the merchant, steals the information on the magnetic stripe of a customer's credit card and then makes a forged copy of the original card and uses it to generate counterfeit purchases and transactions. Credit card data are gathered by an electronic credit card reader (skimmer). Another form of fraud is stealing the account holder data from statements or through the Internet and then generating a forged banking card with the stolen data.

According to the US Department of Justice and the Nilson Report on consumer-payment systems, in the USA in 2000, 30.4% of the total payments was made with a type of banking card with a total amount of 1.238 trillion dollars and 28.8 billion of transactions. The Nilson Group estimates that this percentage will grow to 48.9% by year 2008 with a total amount of 3.594 trillion dollars and 64.5 billion of transactions. The same report indicates that in 2003 1.728 billion cards were issued in the USA. The 2006 BBB/Javelin survey reported a total of $14.71 billion in credit-card-fraud losses.

Visa's global losses are about $2 billion per annum. If this continues at the same rate, fraud will cost $11 per card by 2008.

Prior Solutions

To reduce card fraud, many techniques have been devised for verifying the authenticity of cards. Typically these prior techniques have involved using unique information on the card to determine authenticity. This unique information may be part of the information on the card's magnetic stripe resulting from the card's production, located in the card's "noise" for example. Or it may be added to the card, for example in the form of an ID comprising numeric and/or text identifiers. U.S. Pat. Nos. 6,098,881, 6,431,445, and 6,899,269 for DeLand provide examples of such prior techniques.

However, one reason for the current magnitude of the magnetic stripe card fraud problem in spite of prior solutions is that it is currently impossible to ensure that the unique data on a card come from the magnetic stripe where they were recorded originally when the card was first issued. The skimming method mentioned above provides an example where such unique data can be stolen and forged onto a fraudulent card.

Therefore there is a need for a system and method that ensures that the unique data on a card come from the magnetic stripe where they were recorded originally when the card was first issued.

BRIEF SUMMARY OF THE INVENTION

The card data stealing, card cloning and other drawbacks and disadvantages of the prior art are addressed by the present invention, a system and method for a card anti-fraud security system (CAFSS). An embodiment of the present invention is the Cardbolt system developed by Servicios Especializados y Tecnología Informática (SETI).

To prevent fraud, a magnetic card's ID, which may be a stripe ID or security chip, is converted to an encrypted card ID, which is stored on the card and in a database. Information about the card's history is also captured, encrypted, and stored on the card and in a database. To validate the card, the magnetic card ID on the card is again converted to the card ID. This card ID is then compared with the card ID for that card in the database. The card history data stored on the card may also be compared, for validity and to determine points of fraud, with the card history data stored in the database. The data in the card's magnetic card ID can also be compared with the decrypted data in the card ID stored on that card to help determine the card's validity, for example, when the database is inaccessible. Card data about the account holder, stored on the card's magnetic stripe, may also be used to create the card ID for verification.

These and other aspects, features and advantages of the present disclosure will become apparent from the following description of exemplary embodiments, which is to be read in connection with the accompanying drawings.

BRIEF DESCRIPTION OF THE DRAWINGS

The following embodiment of the present invention is described by way of example only, with reference to the accompanying drawings, in which:

FIG. 6 is a table that illustrates a control level matrix that provides a configuration structure of the modules of the CAFSS;

FIG. 9 is a block diagram that illustrates the security data stored in a database;

DETAILED DESCRIPTION

The following description explains an embodiment of the present invention's CAFSS. The details of this explanation are offered to illustrate the present invention clearly. However, it will be apparent to those skilled in the art that the concepts of present invention are not limited to these specific details. Commonly known elements are also shown in block diagrams for clarity, as examples and not as limitations of the present invention.

Overview

Figure 7:
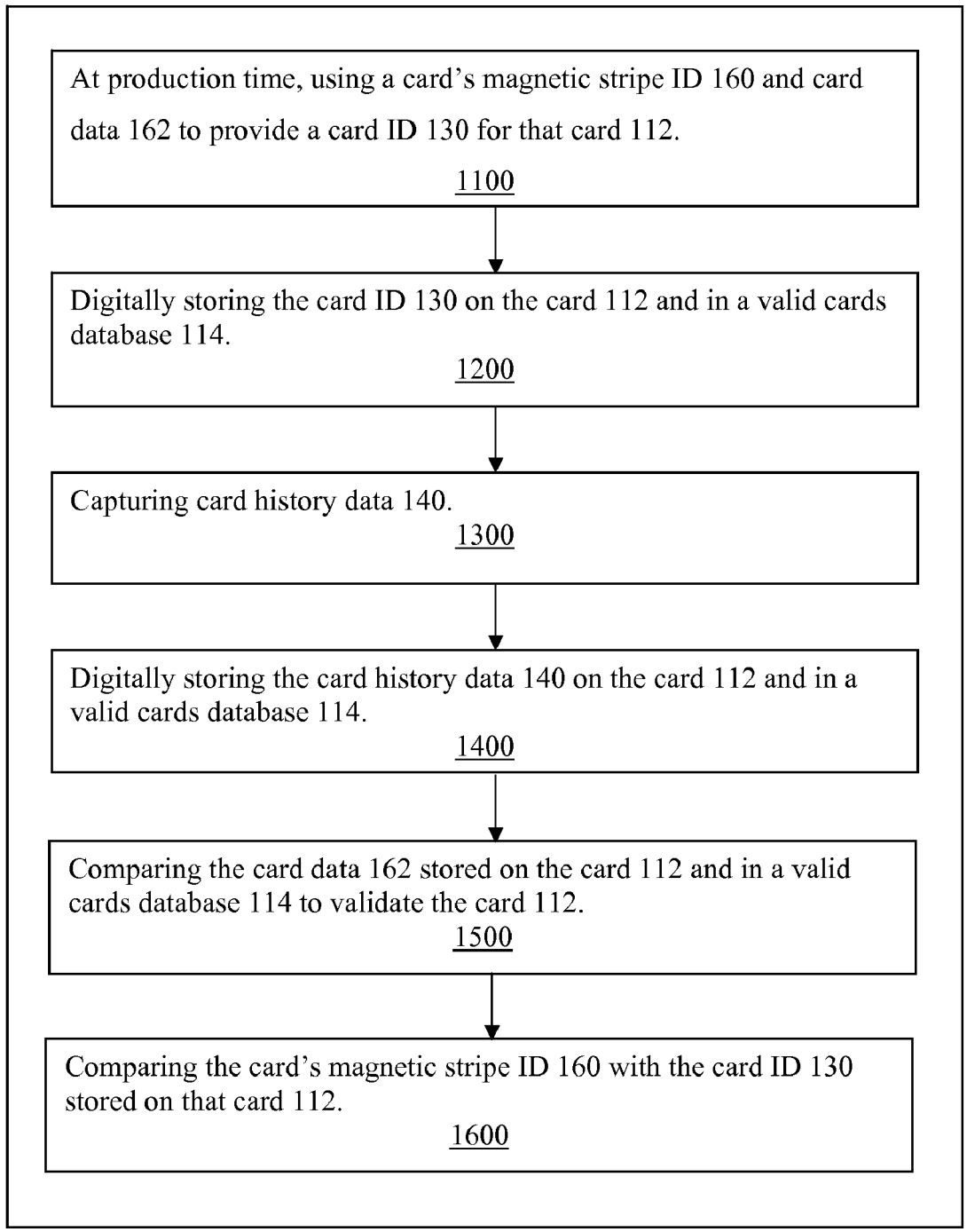
FIG. 7 is a high-level flow chart that illustrates major steps in the CAFSS process.

The present invention provides a system and method for an effective card anti-fraud security system (CAFSS) for reducing card fraud. FIG. 7 is high-level flow chart that shows the general steps the CAFSS uses to validate cards, explained in greater detail later:

Step 1100 in FIG. 7—At production time, using a card's magnetic stripe ID 160 and card data 162 to provide a card ID 130 for that card 112.

At production time, the data in the card's magnetic stripe ID 160 and card data 162 from the bank file are read and are converted to a card ID 130 that, in an embodiment, is encrypted.

Step 1200 in FIG. 7—Digitally storing the card ID 130 on the card 112 and in a valid cards database 114.

The card ID 130 is digitally stored on the card 112 and in a separate database, such as a valid cards database 114.

Step 1300 in FIG. 7—Capturing card history data 140.

Information about the card's history, such as information about the production of the card 112 or about the card holder/account holder of the card 112, is captured. The card history data 140 may record each production stage or transaction of the card 112, from the magnetic stripe card production to the card payment process. In an embodiment, this card history data 140 is encrypted.

Step 1400 in FIG. 7—Digitally storing the card history data 140 on the card 112 and in a valid cards database 114.

The card history data 140 is digitally stored on the card 112 and in a separate database, such as a valid cards database 114.

Step 1500 in FIG. 7—Comparing the data stored on the card 112 and in the valid cards database 114 to validate the card 112.

At a point of sale (POS) involving the card 112, the data in the magnetic stripe ID 160 on the card 112 is read and converted to the card ID 130. This card ID 130 is then compared electronically with the card ID 130 for that card 112 that is stored in the valid cards database 114 to determine the card's validity. The card history data 140 stored on the card 112 may also be read and compared with the card history data 140 stored in the valid cards database 114 to further determine the card's validity.

In embodiments where data on the card 112 is encrypted, that data is first decrypted and is then compared with the other data.

In an embodiment, a card's card data 162, about the account holder, is also read from the card 112, in addition to the magnetic stripe ID 160, and converted to the card ID 130.

Step 1600 in FIG. 7—Comparing the card's magnetic stripe ID 160 with the card ID 130 stored on that card 112.

In another embodiment, at a point of sale (POS) involving the card 112 the data in the card's magnetic stripe ID 160 is read and is then compared with the data in the card ID 130 stored on that card 112 to help determine the validity of the card 112. This may be useful, for example, when the data in the valid cards database 114 is not accessible. In an embodiment where the card ID 130 is encrypted, it is first decrypted and then used as a comparison.

In an embodiment, a card's card data 162, about the account holder, is also used in addition to the magnetic stripe ID 160 for comparison with the stored data, for verification.

The system is designed to store the same security information in multiple ways to reduce the possibilities for card fraud. The security information can be updated at different stages in the history of the card 112. Once the security information has been stored for a card 112, each piece of security data on the card 112 can be compared with equivalent data stored in a different way, as closely as a particular risk demands. Thus, the CAFSS can provide different levels of protection, depending on the amount of information captured and processed by the system.

The CAFSS can be integrated with any card-production process and any data-processing infrastructure, such as a bank processing infrastructure.

Card Producer Aspect

Figure 1:
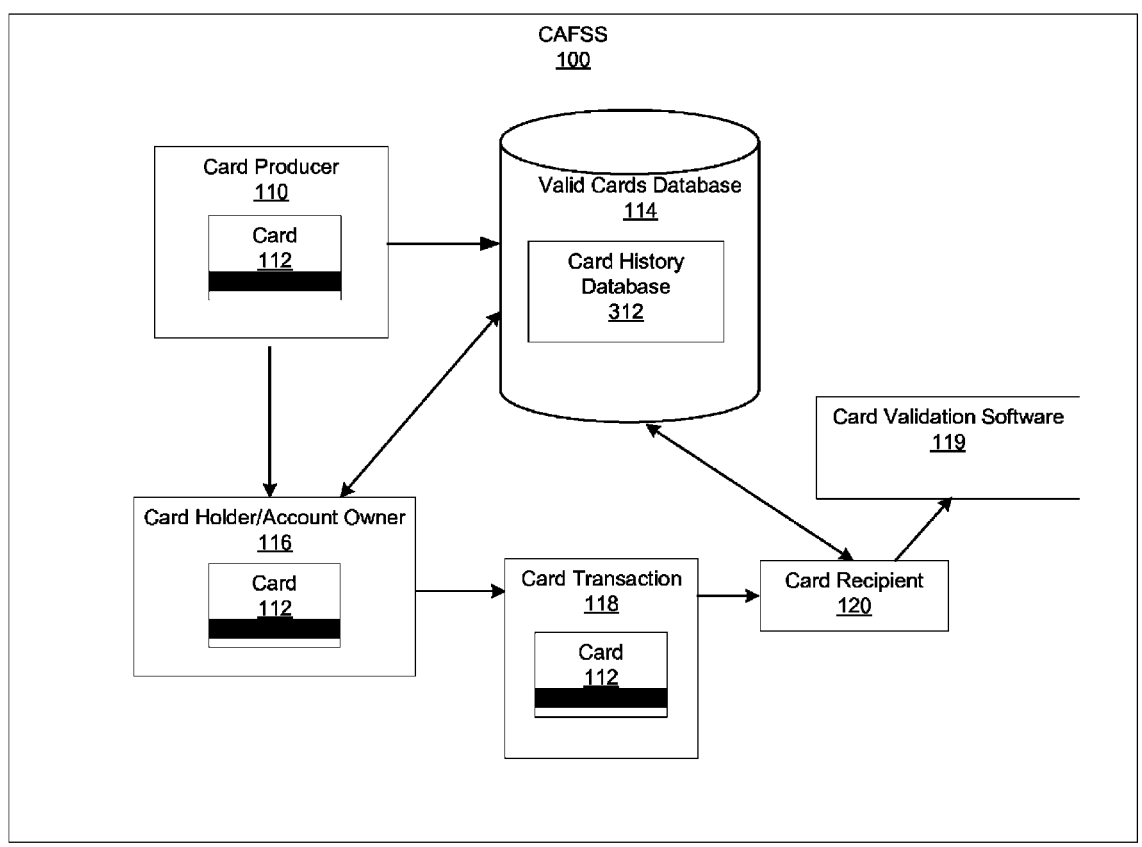
FIG. 1 is a block diagram showing an embodiment of the present invention's CAFSS.

FIG. 1 is a high-level diagram that shows an embodiment of a CAFSS 100. A card 112 is produced by a card producer 110. As part of the CAFSS 100, the card producer 110 automatically captures information on the magnetic stripe and data about the production of the card 112. In different embodiments, the information capture may be accomplished through data-recording techniques known to those skilled in the art, for example imaging cameras, scanners, or magnetic stripe readers.

Figure 8:
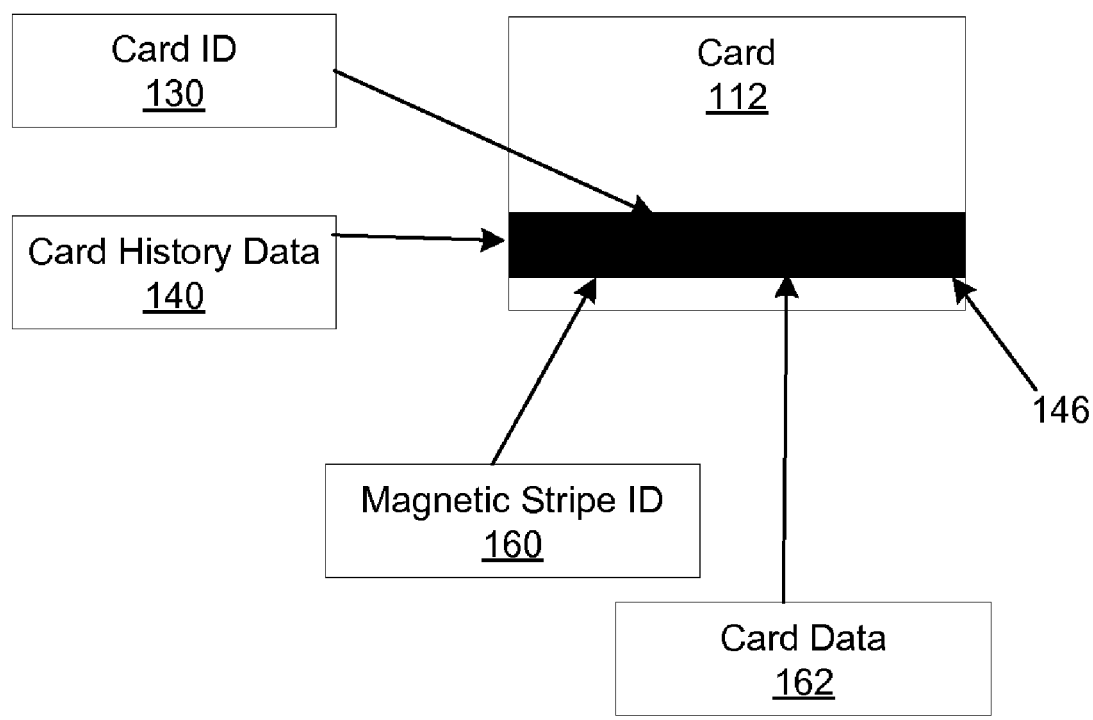
FIG. 8 is a block diagram that illustrates the security data stored on a card's magnetic stripe.

The magnetic stripe 146, shown in FIG. 8, of each card 112 has physical characteristics unique to that card 112. Thus, the physical configuration of the molecules of the magnetic material in the magnetic stripe 146 of a card 112 is like a fingerprint that cannot be changed without altering the card 112. This physical configuration of the magnetic stripe 146 can be read as a magnetic stripe ID 160.

The CAFSS 100 reads this magnetic stripe ID 160 and uses it during the life of the card 112.

The magnetic stripe ID 160 of a card 112 may be used to generate a unique card ID 130 and card history data 140. In an embodiment, the magnetic stripe ID 160 of a card 112 is associated with that card's card data 162, about the account holder, during card production, generating a unique card ID 130 and card history data 140. The card ID 130 and card history data 140 are saved both on the card 112 and in card history database 312 in a valid cards database 114. By comparing this matched data, the CAFSS 100 can authenticate any card 112, preventing counterfeiting and skimming.

In an embodiment, the card history data 140 comprises production history information about the card. For example, the card producter 110, shown in FIG. 1, may create production history information comprising The date and time stamped by each piece of equipment involved in the production process; and The names of the operator and supervisor involved in the production process.

This production history information may be useful for card validation when blank card stock, semimanufactured stock, or defective stock is lost and missused. The CAFSS 100 can use the production history information recorded in the card history data 140 to define where card material was lost and who was responsible for the loss.

The card producer 110 may store the card ID 130, shown in FIG. 9, and card history data 140 in a card history database 312 on the valid cards database 114, shown in FIG. 1. In different embodiments, the data may be stored on one central database or on multiple databases with specialized uses. For example, the valid cards database 114 and card history database 312 may be maintained by a card payment processing service provider or a bank.

The card producer 110, shown in FIG. 1, then issues the produced card 112 to a card holder/account owner 116.

Card Holder/Account Owner Aspect

The card holder/account owner 116 may compare the information on the magnetic stripe 146, shown in FIG. 8, of the card 112 with the information in the card history database 312, shown in FIG. 1, for that card 112, which is stored in the valid cards database 114, to determine the card's authenticity.

The card holder/account owner 116 may also update the card data to show that the card is in possession of the card holder/account owner 116 and may store that update data both on the magnetic stripe 146, shown in FIG. 8, of the card 112 and in the card history database 312, shown in FIG. 1, in the valid cards database 114.

The card holder/account owner 116, shown in FIG. 1, may then use the card 112 for a card transaction 118, such as in payment for goods or services to a card recipient 120, for example to a merchant. At the time of receipt of a card 112 for a card transaction 118, the card recipient 120 may perform card validation through signal communication with the valid cards database 114 to compare the data stored on the card 112 with that stored in card history database 312 for the card 112. Or the card recipient 120 may perform card validation locally by card validation software 119. The card validation software 119 reads the magnetic stripe ID 160, shown in FIG. 8, on the card 112, and in an embodiment also reads the card data 162, generates the card ID 130 data, and decrypts the card ID 130 already stored on the card 112 and compares it with the card ID 130 data. The result of the validation is a valid or invalid answer.

The CAFSS 100, shown in FIG. 1, greatly reduces the possibility of card fraud by the comparison it allows between unique security information generated automatically at the card's 112 production time and stored on the card 112 in the valid cards database 114 and by subsequently updated security information. There is no way to know, predict or have uncontrolled access to the unique security information for a card 112.

Figure 10:
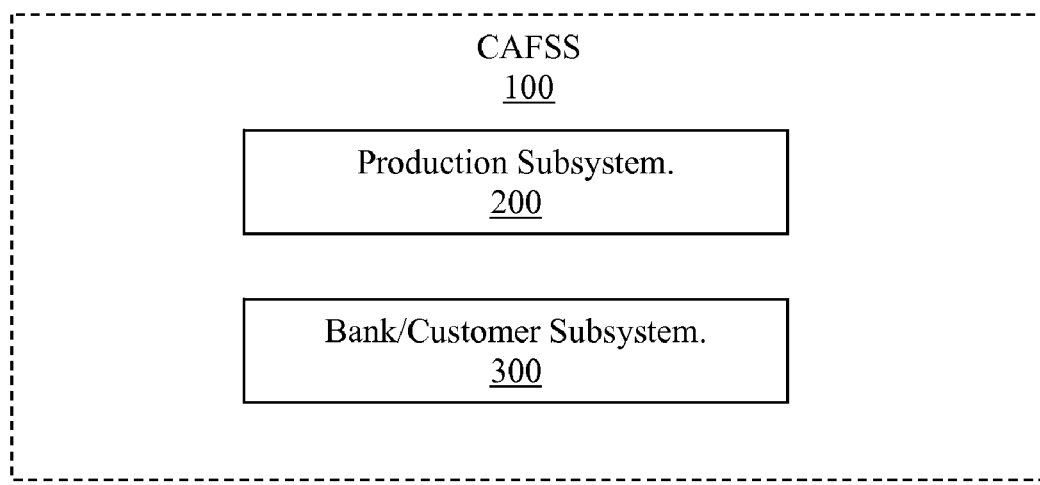
FIG. 10 is a block diagram that illustrates two phases of a CAFSS process.

As described above, the CAFSS has two phases, shown in FIG. 10:

A production subsystem 200, and

A bank/customer subsystem 300.

Production System

Figure 2:
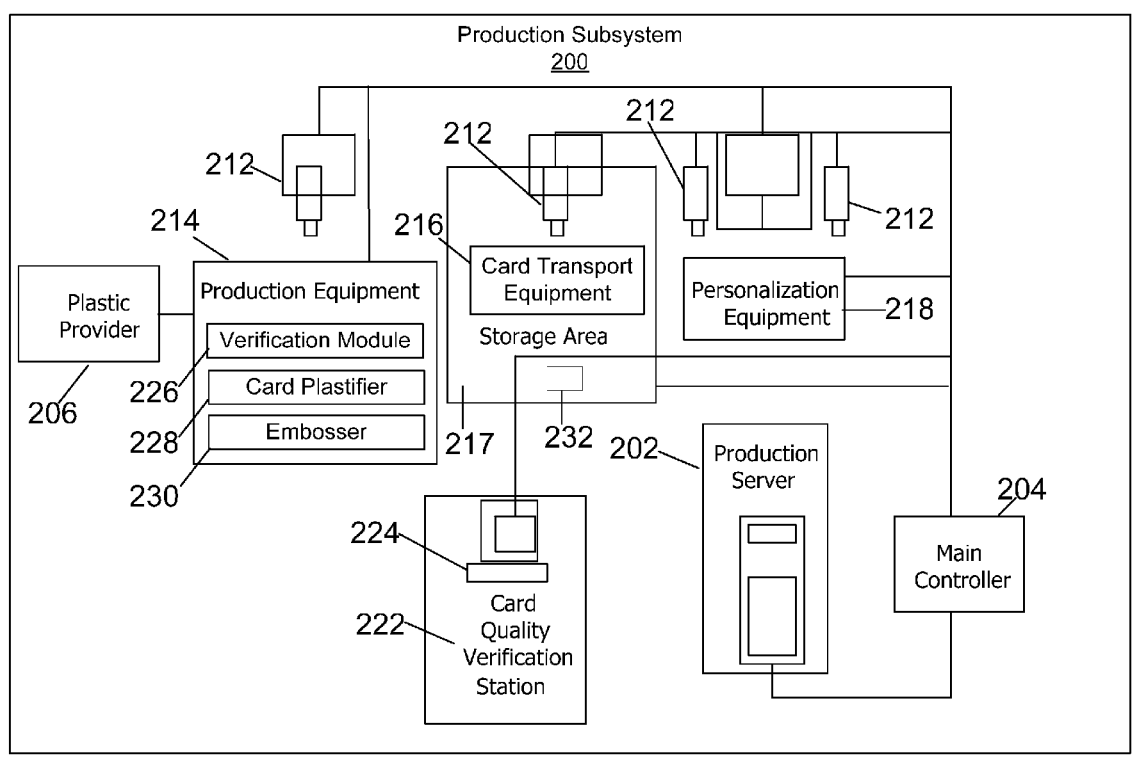
FIG. 2 is a block diagram that illustrates a first phase of the CAFSS involving card production.

Turning to FIG. 2, in an embodiment a first phase of the CAFSS is a production subsystem 200. The production system 200 is used after a plastic provider 206 provides the CAFSS with blank plastic card stock.

The production system 200 includes a production server 202 in signal communication with a main controller 204 and with the following pieces of equipment, known to those skilled in the art:
- card-data recorders 212,
- production equipment 214,
- card transport equipment 216,
- a storage area 217,
- personalization equipment 218,
- a card quality verification station 222, and
- a terminal 224 at the card quality verification station 222.

The card-data recorders 212 collect magnetic stripe card data, using electromagnetic reading heads and software tools, from the magnetic stripe 146, shown in FIG. 8, of the card 112 during the production process. Examples of card-data recorders 212, shown in FIG. 2, are cameras, scanners, and readers.

In an embodiment, the production equipment 214 may comprise a verification module 226, card plastifier 228, and an embosser 230. The production equipment 214 is used to verify and capture all the cards received from the plastic provider 206. This is the first point of data capture for the CAFSS. Only cards whose serial number can be read by the production verification module 226 are considered valid.

After the cards are processed by the production equipment 214, they are moved by card transport equipment 216 to a storage area 217 for further processing by the personalization equipment 218 required to produce the final cards. For example, the personalization equipment 218 may comprise encryption equipment. The magnetic stripe card data is recorded, and one or more card-data recorders 212 capture the magnetic stripe ID 160, shown in FIG. 8, and in an embodiment the card data 162, to generate at that point the card ID 130 and card history data 140.

Returning to FIG. 2, at the card-quality verification station 222 a terminal 224 allows the quality inspectors to verify and register statistical data on the quality of the produced cards.

Bank/Customer System

Figure 3:
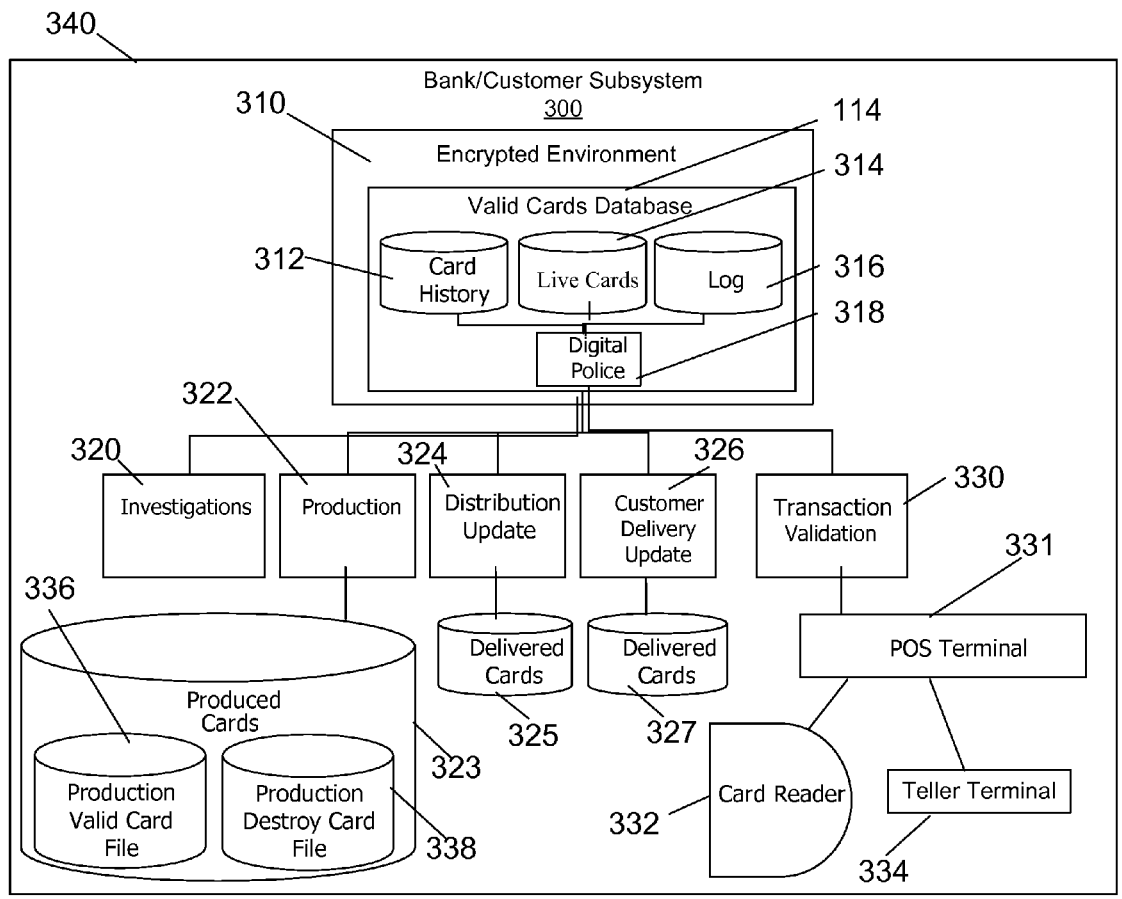
FIG. 3 is a block diagram that illustrates a second phase the CAFSS involving verifying point-of-sale transactions.

FIG. 3 illustrates a second phase or bank/customer subsystem 300 of the CAFSS. The bank/customer subsystem 300 includes an encrypted environment 310 containing the valid cards database 114. The valid cards database 114 includes a card history database 312, a live cards database 314, and a log database 316, each in signal communication with a digital police unit 318. The encrypted environment 310 may be realized by the provision of encrypted access paths connected to each of the databases mentioned above. An embodiment of an encrypted environment 310 is the "Black Box" technology developed by Servicios Especializados y Tecnología Informática (SETI).

The digital police unit 318 controls and records all input/output activities of the encrypted environment 310, registering the log database source, destination, action, result, date, and time for each activity. It is in signal communication with an investigations unit 320, a production unit 322, a distribution update unit 324, and a transaction validation unit 330.

The production unit 322 receives from the card producer 110, shown in FIG. 1, a produced cards file 323, shown in FIG. 3, which typically contains security information, such as card IDs 130 and card history data 140, for multiple cards 112 produced by a card producer 110, shown in FIG. 1. The production unit 322, shown in FIG. 3, processes the data and updates the security information in the card history database 312 and the live card database 314.

When a card holder/account owner 116, shown in FIG. 1, uses a card 112 for payment to a merchant who has point-of-sale (POS) terminals 331, shown in FIG. 3, with card readers 332, the transaction validation unit 330 is in signal communication with teller terminals 334 and card readers 332 at the POS terminals 331. The objective of the transaction validation unit 330 is to validate the card information automatically read by the card reader 332 with the data in the live card database 314, delivering a binary answer: valid or invalid.

Production System Process

Figure 12:
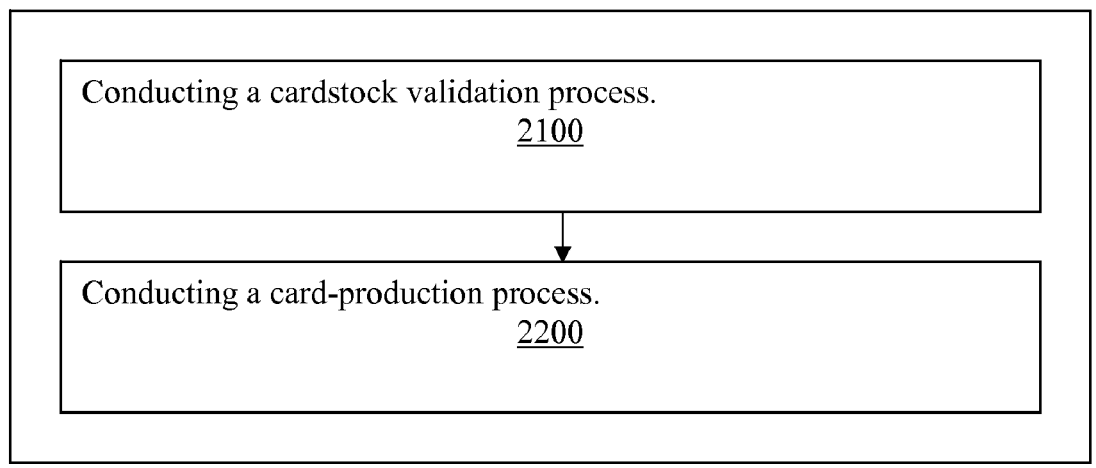
FIG. 12 is a flow diagram that illustrates the processes used in the production subsystem.

FIG. 12 shows an embodiment of the process used by the production system 200, shown in FIG. 2, comprising the following steps, explained in detail below:

Step 2100 in FIG. 12—Conducting a cardstock validation process; and

Step 2200 in FIG. 12—Conducting a card-production process.

Card-Stock Validation Process

Figure 4:
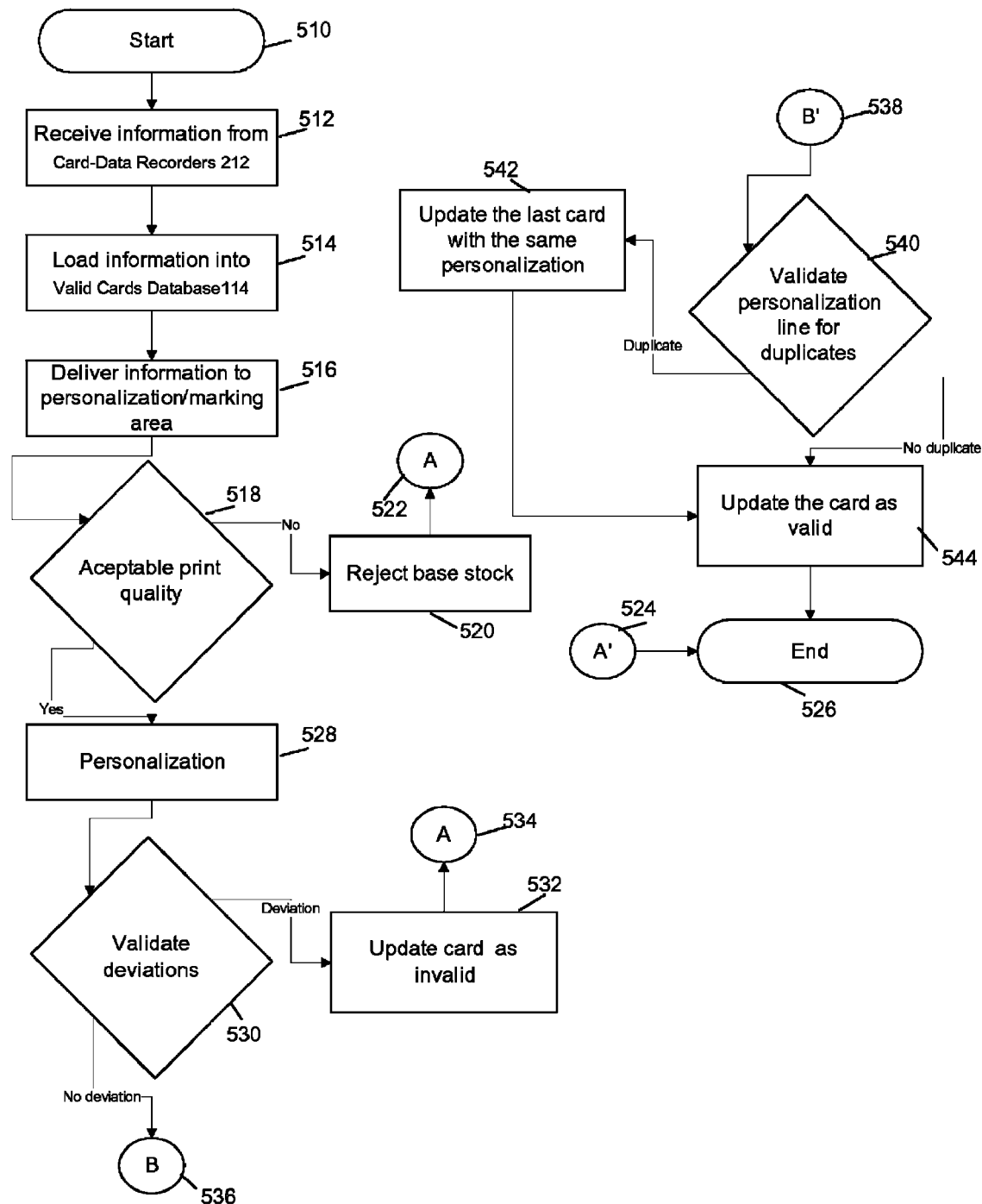
FIG. 4 is a flow diagram that illustrates a card-stock validation production process.

FIG. 4 illustrates the first phase of the CAFSS: the cardstock validation process. A start block 510 passes control to a function block 512 for receiving information from one or more card-data recorders 212, shown in FIG. 2, installed in the production subsystem 200.

Returning to FIG. 4, block 512 passes control to a function block 514 for loading the captured information into a valid cards database 114. The data captured at the different stages of the production process allows the CAFSS to define and control production wastes that could be used in card counterfeiting. This information will be preserved in the card history database 312, shown in FIG. 1, in the valid cards database 114. Block 514, shown in FIG. 4, in turn passes control to a function block 516 for delivering information on card personalization to the encoding area in the personalization equipment 218, shown in FIG. 2, to verify which identified blank card will be entering the personalization printing and the card data recording areas. Following block 516, shown in FIG. 4, a decision block 518 determines whether the production quality is acceptable.

If the production quality is not acceptable, control passes to a function block 520 to reject the defective card, and hence to an END block 526 via intermediate diagrammatic connectors 522 and 524, respectively.

If the production quality is acceptable, a step 528 performs personalization printing and embossing and records the corresponding card data, according with the data received from the production data file for that batch and then passes control to a decision block 530. The decision block 530 validates deviations like damaged or defective cards that
- Are detected as waste,
- Are not manufactured within the batch being processed,
- Are not assigned to the current operator of a predefined piece of equipment, or
- Are not manufactured at the production facility.

If a deviation is found, control passes to a function block 532. The block 532 updates the card as invalid in the database, and proceeds to the END block 526 via intermediate diagrammatic connectors 534 and 524, respectively.

If no deviations are found at the decision block 530, control passes to a decision block 540 via intermediate diagrammatic connectors 536 and 538, respectively.

Card data duplicates can occur as an error or as a result of a reprocess due to production problems in the following stages, but there should be only one card 112 with the corresponding data recorded and registered at the produced card file 323, shown in FIG. 3.

Returning to FIG. 4, the decision block 540 validates the card data for duplicates. If a duplicate is found, control passes to a function block 542 to update the database entry for the last card produced with the same card data as invalid, flag a deviation, and then passes control to a function block 544.

If the decision block 540 finds no duplicates, control passes directly to the function block 544. This function block 544 updates the card as valid. Control then passes to the END block 526. The entire card-stock validation process is performed automatically at production speed.

Card-Production Process

After validation of the card stock, the CAFSS can complete its card-production process. In this process, the magnetic stripe card data on the card is captured by a card data recorder 212, shown in FIG. 2. With a user-selected structure function or an algorithm, the card ID 130, shown in FIG. 8, and the card history data 140, are then created and are recorded on the card 112. In addition, the card ID 130 and card history data 140 are stored in the card history database 312, shown in FIG. 1, in the valid cards database 114.

The blank magnetic card stock can thus be controlled as closely as possible and as early in the process as possible. The capability is provided to generate a detailed monitoring and individual responsibilities for each process step in order to minimize theft of blank cards.

Figure 11:
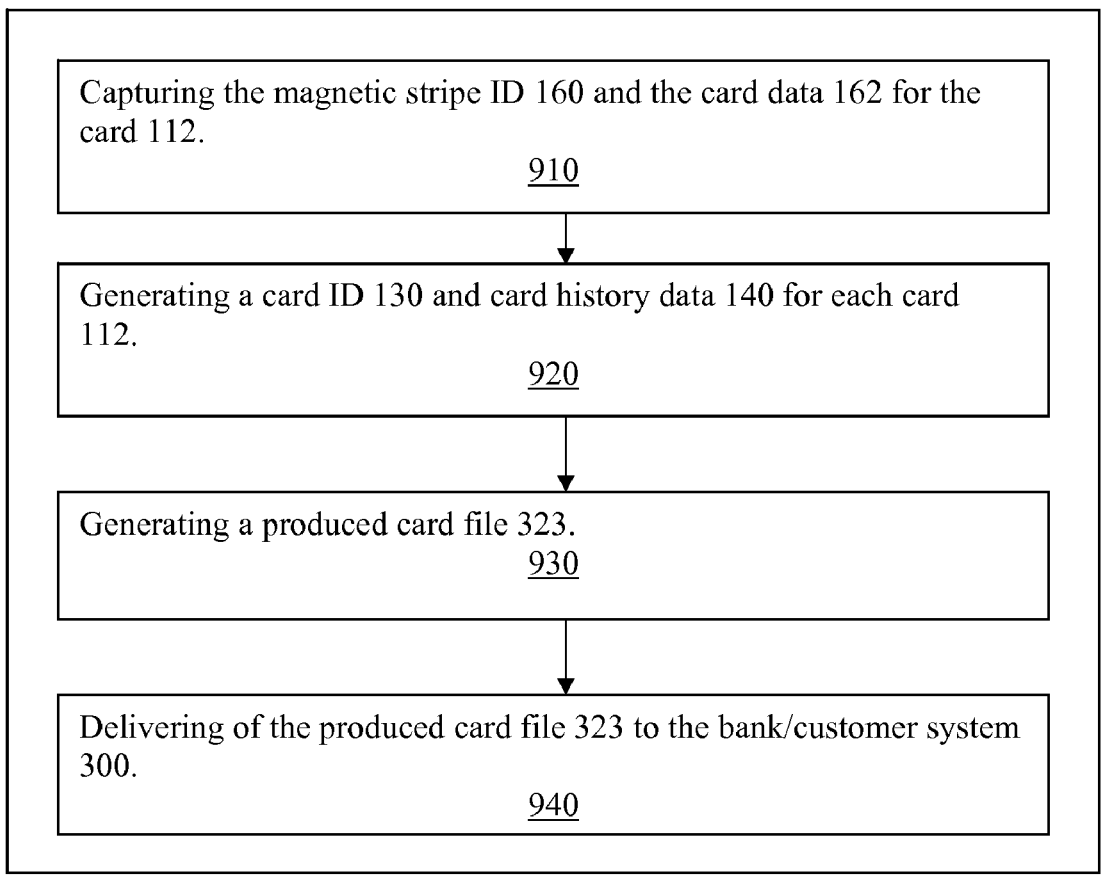
FIG. 11 is a flow diagram that illustrates a card-production process.

FIG. 11 shows an embodiment of the card-production process used by a first phase or production subsystem 200, comprising the following steps:

Step 910 in FIG. 11—Capturing the magnetic stripe ID 160 and the card data 162.

The magnetic stripe ID 160 is a code that represents the physical structure of the magnetic compound on the stripe (like a finger print), and the card data 162 is the information of the account holder for the card 112.

Step 920 in FIG. 11—Generating a card ID 130 and card history data 140 for each card 112.

Generating a card ID 130 for each card 112 is achieved by reading the magnetic stripe ID 160, shown in FIG. 8, from the physical characteristics of the magnetic material of the magnetic stripe on the blank card stock using a special decoder and reading the card data 162. The card ID 130 is then generated as soon as the card data is printed, using a mathematical function that associates the magnetic stripe ID with card data 162 such as the account number and personal data.

Step 930 in FIG. 11—Generating a produced card file 323.

All the card IDs 130 generated in a card production batch are recorded in the produced card file 323, which is a file of valid cards.

Step 940 in FIG. 11—Delivering of the produced card file 323 to the bank/customer system 300.

All card IDs 130 that are not included in the produced card file 323 are invalid.

This produced card file 323 is delivered to the second phase or bank/customer subsystem 300 to update the card history database 312, shown in FIG. 3, and live card database 314 on the encrypted environment 310. This requires a number of production control modules for each of the steps of the production process. Each production control module is integrated by an intelligent reader system that can capture magnetic stripe IDs 160 and card data 162, shown in FIG. 8, from the cards 112, in the process of passing through the system at production speed, plus the information of the equipment, operator, shift, time and date of the moment each card passed through each production step.

Thus, responsibilities are defined at the operator level to help criminal investigations, for example, by identifying the origin of the fraud. A system server module or unit keeps track of the information captured in all the production control modules.

It is emphasized that the creation of a card ID 130 and card history data 140 for the blank card stock should be accomplished as early as practicable in the card-production validation process.

POS Teller Process

Figure 5:
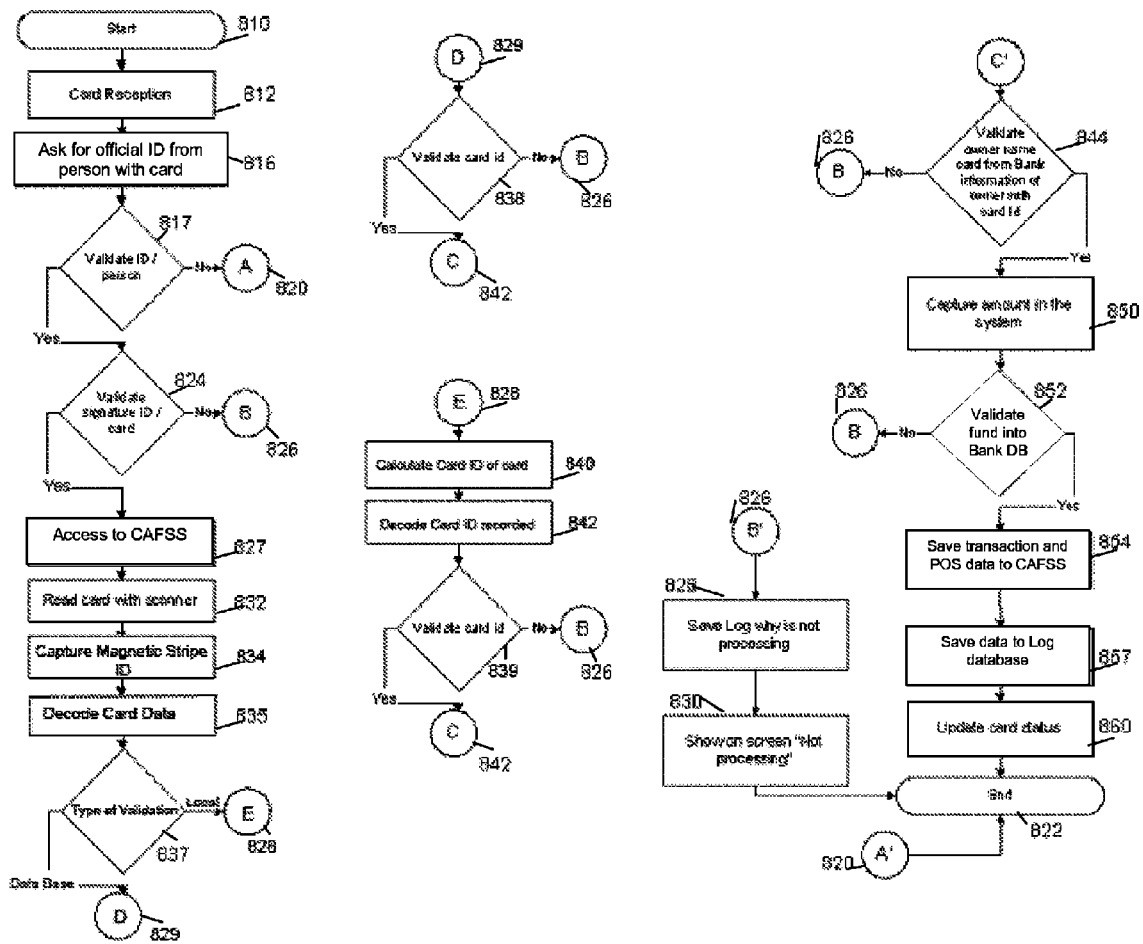
FIG. 5 is a flow diagram that illustrates a point-of-sale process.

FIG. 5 illustrates an embodiment of a point-of-service (POS) teller process for POS transaction card validation using bank/customer subsystem 300 of FIG. 3. A start block 810, shown in FIG. 5, passes control to a function block 812 to perform the reception of a card 112 by a teller at his workstation in a merchant office where the CAFSS is installed. The block 812 leads to a function block 816 to request an official identification from the person presenting the card 112 as a payment media. The block 816 leads to a decision block 817 that determines whether the identification matches that of the person presenting the card 112.

If the identification does not match, control passes through the diagrammatic connector 820 to an end block 822.

If the identification does match, control passes to another decision block 824 to validate the signature security of the card versus that of the persons ID. If the receiver finds something wrong, control passes through a diagrammatic connector 826 to a function block 828, which saves a log register indicating why the card payment was not processed The block 828 passes to a function block 830, which displays a message that the card was not processed on the screen of the teller workstation. The block 830, in turn, passes control to the end block 822. In this stage an automatic signature verification system might be used instead the teller verification.

If the block 824 does validate the signature security of the card versus identification, then control passes to a function block 827 to access the CAFSS, which, in turn, passes control to a function block 832 to read the card data automatically with a card data recorder. The block 832 leads to a block 834 to capture the magnetic stripe data of the presented card 112, which leads, in turn, to a function block 835 to decode the recorded information on the presented card 112 to get the original card ID 130 and card history data 140 by a software algorithm. The block 835 leads to a decision block 837 to ask if the validation will be made locally by a software application, passing control to connector 828, or through the valid cards database 114, passing control to connector 829 to integrate the security data on the card 112 and validate it against the security data in the valid cards database 114 in decision block 838. If the validation fails, control passes through the diagrammatic connector 826 as previously described.

If the validation is made locally, process is transferred to connector 828, which in turn passes control to function block 840 to calculate the corresponding security data of the presented card 112. Then in 842 the recorded original security data is decoded from the information recorded in the presented card 112 and in decision block 839 both values obtained in 840 and 842 are compared to validate the security data. If they do not match, control passes to connector 826.

The CAFSS optionally allows verification of additional security measures like card account owner data verification, signature verification, and credit limit verification. FIG. 5 only shows the system with basic features included.

If the validation succeeds in any case, control passes to connector 842 and then to a function block 844 for validating the card account owner's name against bank information corresponding to the security data (The system shows on the terminal screen the name of the owner, and then POS teller verifies the name on the card 112 with the name on the screen). If the owner's name does not match, control passes through the diagrammatic connector 826 as previously described.

If the card owner's name matches, control passes to a function block 850 to capture data corresponding to the payment amount into the system. The block 850 leads to a decision block 852 to validate the card payment amount against the credit limit available in that account in a bank database. If there are not enough funds in the account, control passes through the diagrammatic connector 826 as previously described.

If all the validations included in the CAFSS succeed, control passes to a function block 854 to save into the CAFSS the transaction information and the POS terminal information. This then leads to a function block 857 to save the corresponding register of a successful transaction in the log database 316, shown in FIG. 3, within the valid cards database 114.

With optional modules, the CAFSS can also verify a valid account, the account owner name, credit limit to cover the amount of payment, signature verification.

The data in the card history database 312 allows a fraud investigator to define individual responsibilities and allows the identification of the individual responsible for any fraud when a card 112 is presented at a point of sale. If a fraud is committed with a card 112 that, according information on that card's magnetic stripe ID 160, and, in an embodiment, card data 162, in the card history database 312, should have been destroyed as defective at some point in the production process, then the individual responsible for the fraud was the operator or supervisor who should have destroyed that card 112. All these details are recorded in the card history database 312.

The Usefulness of Card History

The CAFSS 100, shown in FIG. 1, records all the details of the path of the card 112 through its life, registering the date, time, shift, and operator of each machine, pieces of equipment, or workstation involved in the production process for the card 112, and the delivery of the card 112 to the card holder/account holder 116 and the payment/cashing process.

With all this information in the valid cards database 114, the CAFSS 100 may generate different types of useful reports, such a security reports (transaction log, valid cards, invalid cards, etc.) and production reports (total of cards produced, operator balances, etc.), depending on customer needs.

The CAFSS 100 has a very strong access security structure that allows the definition of the system administrator and authorized users and the functions they can perform in the CAFSS 100. In an embodiment, many of the processes require double user identifications or personal passwords. In an embodiment, the CAFSS 100 accepts biometric devices instead of passwords (e.g., fingerprint and/or retina reader) to further increase security.

Detailed Description of an Embodiment

The following sections provide detailed information about elements of an embodiment of the CAFSS.

The Transaction Validation Unit

In the second phase or bank/customer subsystem 300, shown in FIG. 3, the transaction validation unit 330 verifies at the cashing point whether the presented card 112, shown in FIG. 1, is a valid card. A production valid card file 336, shown in FIG. 3, updates the live card database 314 with card IDs 130, shown in FIG. 9, for valid cards entering the CAFSS. The live cards database 314, shown in FIG. 3 holds the card IDs 130, shown in FIG. 9, for the valid cards in circulation. Only the card IDs 130 in the live card database 314 identify valid cards. All other IDs are considered invalid.

This functionality rests on the integration of the live cards database 314 with the data processing infrastructure (ideally the card payments processing application) of the bank or verifying organization. With this structure, the verification process can be performed at every workstation or point of sale terminal connected to the bank network.

Encrypted Environment

Because of the importance of maintaining the security of the live cards database 314, this data base 314 is contained in the encrypted environment 310, which uses an encrypted structure and a controlled access. The encrypted environment 310 is a hardware and software data storage structure that may be located at the bank or at the verifying organization.

The Magnetic Stripe ID

The process at the first phase or production subsystem 200, shown in FIG. 2, begins by identifying the blank magnetic stripe cards as early in the production process as possible with the magnetic stripe ID 160, shown in FIG. 8. The identifier may be numeric, alphanumeric, a code (such as bar code, bi-dimensional matrix, and the like), consecutive or the result of an algorithm, function of the physical characteristics of the magnetic material of the magnetic stripe on the card. The physical characteristics of the magnetic material of the magnetic stripe 146 on a card 112 are unique at molecular level and generate a background signal that is equivalent to a finger print for a human. A special magnetic reader reads this signal, and the signal levels are entered to the mentioned function, resulting in the unique magnetic stripe ID 160 for that particular card 112.

The production subsystem 200 then reads and records the magnetic stripe ID 160 as the card being produced passes through each of the steps of the card production process. This allows a very close follow-up of the status of each blank card, thereby discouraging card stealing and/or equipment operator bribing, and allows for the definition of responsibilities at the operator level.

Card ID

During the personalization process, the card data 162, shown in FIG. 8, is recorded and the personalization data (card account owner name) is printed. At this point, the CAFSS generates the card ID 130 for each produced card, associating the magnetic stripe ID 160 (blank card stock=blank magnetic stripe cards with the bank/customer image) with the card data 162 (account number and personal data) thereon. Before this encoding step, the card is undefined as it is merely blank card stock. A card is defined by printing and recording the card data 162 on the magnetic stripe card blank stock.

The card ID 130 is integrated when the card data is recorded 162 on a particular card (with its magnetic stripe ID 160) so that there is no way of predicting the card ID 130 beforehand, because it is unknown which blank card stock will be fed and which card data will be recorded at any given moment.

Using intelligent card recorders 212, shown in FIG. 2, with background signal decoding ability and standard magnetic data reading/recording capability, the production subsystem 200 reads, at production speeds, the magnetic stripe ID 160 and the card data 162 and then correlates them, such as, for example, by mixing them together or using an algorithm, to create the card ID 130. The card ID 130 is recorded on the produced card 112 and in a produced card file 323, shown in FIG. 3, which are the primary and secondary sources for later validation at any POS.

Production Control Modules

The magnetic stripe ID 160 data capture for step 512 of FIG. 4 is a high priority security function, and it is not allowed to pass blank card stock without being read. Thus, all production control modules, 214, 217 and 218 shown in FIG. 2, have the additional capability of controlling the operation of the production/printing equipment where they are installed. In this embodiment, each production control module, 214, 217 and 218, of the CAFSS must be fully functional before the security system allows production equipment to start production. In case of a security system module failure, the system will halt the production equipment. As a result, all production control modules are designed with a very high availability in order to keep production interruptions to a minimum.

There may be different types of production control modules, 214, 217 and 218. All the production modules 214, 217 and 218 are connected to the production server 202 in a data network.

The card data recorders 212 capture magnetic stripe ID 160 data through the different steps of the production process 200, starting at module 214, and transfer the information to the production server 202. Card-data recorders 212 are installed on the equipment at the deployment rate of one card data recorder 212 for each equipment unit where control is desired. Due to the different types and models of the production equipment, the installation requires the integration of adequate bracketing for each case.

Controller

The local capture controller 204, shown in FIG. 2, that receives the information from the card data recorders 212, also processes it by applying the required filters or functions and sends the processed information to the server 202. The controller 204 employs a software application that decodes the background signal into the predefined corresponding set of characters. Each module includes one or two high-speed readers, depending on the width of the reading field.

Storage Reader Module

In an embodiment, a storage (blank card stock) reader module 232 may be employed to help in the control of security blank card stock input and output ("I/O") from the storage areas. Such a module is particularly useful where there is an intermediate storage area in the production process, such as, for example, where the blank card stock is produced in a different plant from where the cards are personalized and finished. Thus, the module may be applied to control the blank card stock in the custody of each operator.

Personalization Equipment

The personalization equipment 218, shown in FIG. 2, may have different configurations in different embodiments.

Personalization Input Module

In one embodiment, a personalization input module prevents base stock other than that assigned to a specific operator to be fed into the personalization equipment 218, shown in FIG. 2. At least one high-speed card data recorder 212 is mounted on the input feed path to verify this condition with the information on the main controller 204.

Personalization Output Module

The personalization equipment 218 comprises a personalization output module in all embodiments. In an embodiment, this module is mandatory for the production subsystem 200. One such personalization output module for each piece of personalization equipment 218 is recommended. Modules 214 and 217 may be added depending upon the desired level of control.

The personalization output module controls the produced cards 112 that leave the equipment as finished cards, reads the magnetic stripe ID 160 number and the card data and generates the card ID 130 information for each card 112. The personalization output module is installed at the last available space at the output path and includes a local capture controller that receives the information from the cameras/scanners/readers, processes it by applying the required filters or functions, and sends the interpreted information to the server 202.

The personalization output module 218 has a software application that handles the background noise encoding processing functions. It also has at least one high-speed reader where the number may depend on the number of finishing lines.

Card-Finishing Quality Verification Module

A card-finishing quality verification module 222 is a visual verification station for quality assurance. Here, the operator verifies printing quality, card data properly recorded and encrypted card ID 130 corresponding with the card data and card finishing quality.

Produced Card File

Along with the finished cards, the final product of the production subsystem 200 is the produced card file 323 that is the input to the second phase or bank/customer subsystem 300 of FIG. 3. The produced card file 323 contains a production valid card file 336, which lists cards considered valid after production. It also contains a production destroy card file 338, which lists cards that for some reason were destroyed after production.

Data Structures in the Encrypted Environment

As shown in FIG. 3, the bank/customer subsystem 300 uses three data structures to integrate, maintain, and control access to the card security information of the CAFSS:

a card history database 312, a live card database 314, and an activity log 316, These data structures are protected by a hardware/software module named digital police 318. In this patent application, this system to integrate, maintain, and control such access is referred to as the encrypted environment 310.

The encrypted environment 310 is the core of the bank/customer subsystem 300. It has all the information on the live cards 112 and is integrated with the bank/service provider data network (LAN/WAN). This allows a second source of verification of the authenticity of each card 112 presented for payment at any workstation, teller or point of sale terminal in the network.

Depending on the service parameters and the bank/service provider infrastructure, the encrypted environment 310 may be implemented entirely as a software structure or as a combination of hardware and software. The encrypted environment 310 is fully integrated to the card payment process application of the bank and may be installed as a disk file within the application.

In an embodiment, the encrypted environment 310 in its hardware/software version includes a solid state disk structure for the live card database 314 to ensure the fastest response time, a RAID (redundant array of independent disks) storage structure for the card history database 312 and the activity log database 316 to insure data integrity and non-stop availability. Both storage structures are controlled and managed by a specialized storage multiprocessor server. The encrypted environment 310 has an Open Systems structure and an on-line transaction processing ("OLTP") data structure that allows it to be integrated with any data/communications network.

The card history database 312 is a preferred source of information to investigate card fraud. The log database 316 keeps records of all the transactions to the encrypted environment 310, registering the origin of the transaction, purpose, target, result, and date/time information. The live card database 314 keeps the card IDs 130 for all of the valid cards 112 that are available for use, i.e. the "live cards".

The digital police 318 processes all the transactions that the encrypted environment 310 receives. It verifies the right code (encryption) and the authorized access and function of every user/workstation/terminal/software module that attempts to get access to the valid cards database 114 and keeps a detailed record of all activities at the activity log database 316.

Software Modules in the Encrypted Environment

The bank/customer subsystem 300 also has several software modules that update the data structures in the encrypted environment 310 and perform the verification and investigation processes. All the software modules are controlled by the encrypted environment administrator module 340.

The first source of card authenticity verification is the produced card 112 itself, because its card ID 130 is recorded on it in an encrypted mode. In an embodiment, the POS terminals 331 must be equipped with magnetic stripe readers that can read the background signal and the recorded data on the tracks of the magnetic stripe 140 of the cards 112 issued for payment and the decoding software to open the encrypted card ID 130 and compare it with the actual card data.

Production Software Module

A production software module 322 receives the produced card file 323 generated at the production subsystem 200, which is a detailed register of card IDs 130 for each produced card 112. Every entry in the produced cards file 323 contains a unique card ID 130.

The production software module 322 also comprises the production card history data 140 and the detailed data generated at each production control module, including all entries and deliveries of the blank card stock that enters the production process, keeping track of each card in the stock.

With this produced card file 323, the production software module 322 updates the card history database 312 and the live cards database 314. There are several statuses available for the cards 112 in the live cards database 314.

Valid cards include all the cards 112 reported to the CAFSS by the production subsystem 200.

Transit cards include the cards 112 given to the courier service.

Delivered cards include cards 112 delivered to the card holder/account holder 116. At the time of activation by the card holder/account holder 116, the card responsibility is likewise transferred from the bank to the card holder/account holder 116.

Distribution Update Software Module

The distribution update software module 324 handles all the card distribution process from the production shop to the card holders/account holders 116, shown in FIG. 1, keeping track of all events during the process, generating the delivered card file 325, shown in FIG. 3. Once the delivery process is finished, the system updates with the delivered card file 325 the card history database 312 and live cards database 313 on the encrypted environment 310.

The distribution update software module 324 keeps track of the cards delivered to the producer/courier/distributor, compares them against the produced cards file 323, reports the differences, and updates the live cards database 314.

The Customer Delivery Update Software Module

The customer delivery update software module 326 handles the card delivery to the card holder/account holder 116, generating the delivered card file 327. Once the process is finished, the CAFSS updates the card history database 312 and live cards database 314, on the encrypted environment 310, with the delivered card file 327. At this point in the process, when the card holder/account holder 116 has responsibility for the card 112, the valid cards are transformed into live cards within the live cards database 314. No cards that are not in this status are considered valid by the CAFSS.

The Transaction Validation Software Module

The transaction validation software module 330 handles the authentication and verification processes in the CAFSS. When a card 112 is received by a teller and read at a POS terminal 331 with a magnetic stripe reader able to read the data and the background signal (magnetic stripe finger print), the magnetic stripe ID 160 and the card data 162 are captured in the CAFSS. This background signal is translated to a specific code (card ID 130) for that particular finger print of the magnetic material on that stripe.

There are two sources to verify the magnetic stripe ID 160:
comparing the code read from the physical card 112 presented with the encrypted card ID 130 stored as data in the magnetic stripe; and
comparing the code read from the physical card 112 with the card ID 130 stored for that account in the valid card data base 114.

For the first source of verification, the software program part of the CAFSS on the POS terminal 331, or in the PC to which the POS terminal 331 is attached, reads the magnetic stripe ID 160 and card data 162 of the presented card 112 and calculates the corresponding card ID. The encrypted card ID 130 is also read and decrypted, and then the calculated card ID 130 from the physical magnetic stripe ID 160 and card data 162 and the card ID 130 decrypted from the data recorded on the magnetic stripe are compared. If they do not match, the card 112 is invalid.

Using the second source for card validation, the magnetic stripe ID 160 and the card data 162 read are communicated for validation to the live card database 314 at the encrypted environment 310. If the transaction finds a match within the live cards database 314, the teller receives a "valid" answer. If there is no match for the calculated card ID 130 with the card ID 130 stored in the live card database 314, the teller receives an "invalid" answer.

This is the main service provided by the CAFSS. Other verification services also provided by the CAFSS 100 and handled by this module are optional and complementary, for example verification for valid account, signature verification, account owner name and address forgery, credit limit in the account.

The Investigations Software Module

In case of fraud, the investigations software module 320, shown in FIG. 3, enables authorized investigators to gain access to the encrypted environment 310 information, especially the card history database 312. This module requires at least two user signatures or passwords of the appropriate access level. It can be installed in any PC on the network.

Once a card expires, its register is removed from the live card database 314 and moved to the card history database 312.

Advantages

The operation of the CAFSS is based on providing unique card data, in the form of a card ID 130 and card history data 140, storing that data, and making that accessible for validation. If the card data from a card presented for payment translates into the same card data encrypted and recorded on the presented card and/or within the CAFSS live card database, the card is valid. The answer is binary. This software identification prevents against misuse of magnetic stripe cards, thefts of card data, skimming, and many other types of forgery and counterfeiting.

Thus, in case of card fraud, access to the card history database 312, shown in FIG. 3, allows the accurate retrieval of responsibility definitions. The responsibility level may be as detailed as that allowed by the installed configuration. With a fully optioned configuration, the responsibilities reach to the personal level. For example, if the fraudulent magnetic stripe card identification is entered to the card history database 312, the CAFSS may answer that the last production step recorded for that card was at the output of the encoding equipment. That means that it was stolen after that point. Then the destruction acts may be verified. The responsible party would then be traceable to the supervisor that signed for the destruction of that defective card.

A control level matrix, such as the table shown in FIG. 6, provides a configuration structure of the modules of the CAFSS. Thus, the matrix lists the function of each module on an increasing security scale, from the minimum to the maximum levels of security ("S.L.") that the system embodiment provides. The second column of the table indicates whether a module is optional ("O") by inclusion of the "+" symbol.

The CAFSS offers security advantages of fingerprint and intelligent identification card combination access, where combination access is preferably required for high-risk areas. Another advantage is that the system allows the definition of functions specific to each user such that the user has access only to those predefined functions. Another advantage is that production users do not have access to security reports. Another advantage is that a special high-security procedure is required to access the valid card file.

The CAFSS reduces card fraud and tends to make the protected organizations "hard targets" from the perspective of would-be criminals. The system prevents fraudulent events by identifying a fraudulent transaction before it is completed. Thus, it provides a loss prevention tool, a criminal deterrent system, and a criminal investigation information source.

Alternate Embodiments

The previous extended description has explained some of the alternate embodiments of the present invention. It will be apparent to those skilled in the art that many other alternate embodiments of the present invention are possible without departing from its broader spirit and scope. Furthermore, in the previous description the order of processes, their numbered sequences, and their labels are presented for clarity of illustration and not as limitations on the present.

The features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit. It is to be further understood that, because some of the constituent system components and method function blocks depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

For example, as will be recognized by those of ordinary skill in the pertinent art based on the teachings herein, alternate embodiments are possible, such as, for example, an optical computing embodiment. Given the teachings of the disclosure provided herein, those of ordinary skill in the pertinent art will contemplate various alternate configurations and implementations of the production unit 200 and the validation unit 330, as well as the other elements of the disclosed systems, while practicing within the scope and spirit of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

Alternate Embodiments with Security Chips

In addition to the magnetic stripe technology explained above, security chips have been used in cards, such as credit cards, to reduce the possibilities of card fraud. Examples are the Intelligent Chip and the Radio Frequency Identification (RFID) Chip. These security chips cannot be removed without destroying the cards.

Each security chip has a unique serial number that can be used to create a card ID 130, shown in FIG. 8, similar to the way the magnetic stripe ID 160 explained above can be used to create a card ID 130. Moreover, additional security information can also be stored on security chips. Thus, the techniques of the present invention may be with cards with security chips, as well as with other security techniques for cards, known and not yet known.

What is claimed is:

1. A method for financial card anti-fraud security comprising
performing, on a processor of a card anti-fraud security system, a first read step to determine a first characteristic fingerprint of the card;
generating, on a processor of the card anti-fraud security system, a first set of security data from the first characteristic fingerprint;
storing, on the card anti-fraud security system, the first set of security data; and
validating the financial card on a processor of the card anti-fraud security system by
performing a second read step to determine a second characteristic fingerprint of the card,
generating a second set of security data from the second characteristic fingerprint of the card, comparing the second set of security data with the first set of security data, and returning either
a valid answer when the second set of security data matches the first set of security data, or
an invalid answer when the second set of security data does not match the first set of security data, such that the first characteristic fingerprint and the second characteristic fingerprint both comprise a magnetic stripe fingerprint, or an RFID fingerprint, or intelligent chip fingerprint.

2. The method of claim 1, wherein
storing the first set of security data further comprises
   encrypting the first set of security data to produce a first set of encrypted security data, and
   storing the first set of encrypted security data on the card; and
comparing the second set of security data with the first set of security data further comprises
   decrypting the first set of security data, and
   comparing the second set of security data with the first set of decrypted security data.

3. The method of claim 1 wherein
storing the first set of security data further comprises
   storing the first set of security data in a database.

4. The method of claim 1, wherein performing a first read step to determine a first characteristic fingerprint of the card further comprises reading a magnetic stripe ID.

5. The method of claim 1, wherein performing a first read step to determine a first characteristic fingerprint of the card further comprises reading the card data about the account holder.

6. The method of claim 1, performing a first read step to determine a first characteristic fingerprint of the card further comprises reading card history data.

7. The method of claim 6, wherein card history data further comprises production history information about the card, comprising
   the date and time stamped by at least a portion of the equipment involved in the card production process; and
   the names of personell involved in the production process.

8. The method of claim 1, wherein decrypting the stored encrypted data further comprises decrypting the stored encrypted data on the card.

* * * * *